United States Patent
Fan et al.

(10) Patent No.: US 9,846,946 B2
(45) Date of Patent: Dec. 19, 2017

(54) OBJECTION RECOGNITION IN A 3D SCENE

(71) Applicant: Nokia Technologies Oy, Espoo (FI)

(72) Inventors: Lixin Fan, Tampere (FI); Pouria Babahajiani, Tampere (FI)

(73) Assignee: Nokia Technologies Oy, Espoo (FI)

(*) Notice: Subject to any disclaimer, the term of this patent is extended or adjusted under 35 U.S.C. 154(b) by 90 days.

(21) Appl. No.: 14/948,260

(22) Filed: Nov. 21, 2015

(65) Prior Publication Data
US 2016/0154999 A1 Jun. 2, 2016

(30) Foreign Application Priority Data
Dec. 2, 2014 (GB) .................... 1421329.2

(51) Int. Cl.
| | |
|---|---|
| *G06K 9/00* | (2006.01) |
| *G06K 9/46* | (2006.01) |
| *G06T 7/00* | (2017.01) |
| *G06T 7/73* | (2017.01) |
| *G06T 7/11* | (2017.01) |
| *G06T 7/155* | (2017.01) |
| *G06T 7/136* | (2017.01) |

(52) U.S. Cl.
CPC ........ *G06T 7/0091* (2013.01); *G06K 9/00201* (2013.01); *G06T 7/11* (2017.01); *G06T 7/136* (2017.01); *G06T 7/155* (2017.01); *G06T 7/75* (2017.01); *G06T 2207/10028* (2013.01); *G06T 2207/20021* (2013.01); *G06T 2207/20036* (2013.01); *G06T 2207/20076* (2013.01); *G06T 2207/20081* (2013.01)

(58) Field of Classification Search
CPC ......... G06T 7/0091; G06T 7/136; G06T 7/11; G06T 7/75; G06T 7/155; G06T 2207/10028; G06T 2207/20021; G06T 2207/20036; G06T 2207/20076; G06T 2207/20081; G06K 9/00201
See application file for complete search history.

(56) References Cited

U.S. PATENT DOCUMENTS

| | | |
|---|---|---|
| 8,620,089 B1 | 12/2013 | Korah et al. |
| 2009/0310867 A1 | 12/2009 | Matei et al. |
| 2013/0089259 A1 | 4/2013 | Cha et al. |

(Continued)

FOREIGN PATENT DOCUMENTS

WO 2011085435 A1 7/2011

OTHER PUBLICATIONS

Choe et al. "Fast Point Cloud Segmentation for an Intelligent Vehicle Using Sweeping 2D laser scanners." 9th International Conference on Ubiquitous Robots and Ambient Intelligence, Nov. 26, 2012, pp. 38-43.*

(Continued)

*Primary Examiner* — Jon Chang
(74) *Attorney, Agent, or Firm* — Nokia Technologies Oy

(57) ABSTRACT

A method comprising: obtaining a three-dimensional (3D) point cloud about at least one object of interest; detecting ground and/or building objects from 3D point cloud data using an unsupervised segmentation method; removing the ground and/or building objects from the 3D point cloud data; and detecting one or more vertical objects from the remaining 3D point cloud data using a supervised segmentation method.

17 Claims, 4 Drawing Sheets

(56) References Cited

U.S. PATENT DOCUMENTS

2013/0096886 A1*  4/2013  Vorobyov .............. G01C 11/00
                                                          703/1
2013/0218472 A1   8/2013  Fu et al.
2015/0003723 A1   1/2015  Huang et al.

OTHER PUBLICATIONS

Search Report issued for GB1421329.2 dated May 27, 2015 in 4 pages.

* cited by examiner

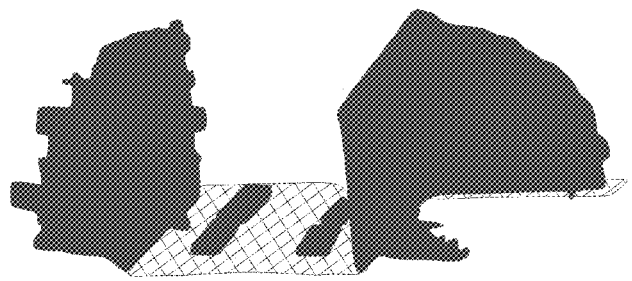
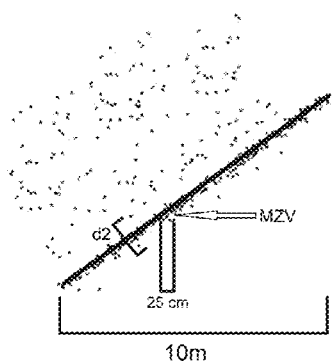
Fig. 3a
Fig. 3b
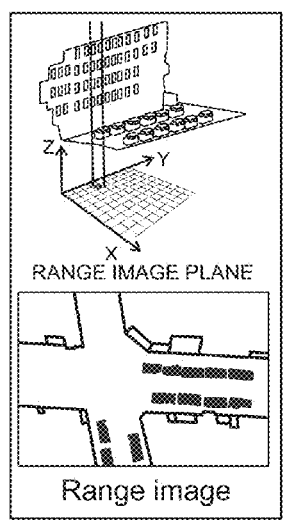
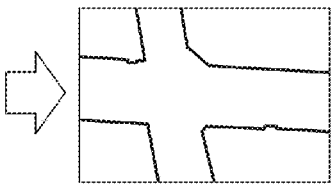
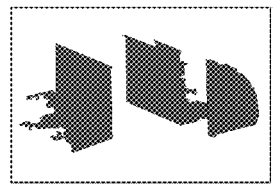
Fig. 4a
Fig. 4b
Fig. 4c

|  | Tree | Car | Sign | Person | Fence | Ground | Building |
|---|---|---|---|---|---|---|---|
| Tree | 0.89 | 0.00 | 0.07 | 0.00 | 0.04 | 0.00 | 0.00 |
| Car | 0.03 | 0.95 | 0.00 | 0.00 | 0.02 | 0.00 | 0.00 |
| Sign | 0.17 | 0.00 | 0.72 | 0.11 | 0.00 | 0.00 | 0.00 |
| Person | 0.03 | 0.00 | 0.27 | 0.78 | 0.00 | 0.00 | 0.00 |
| Fence | 0.03 | 0.00 | 0.00 | 0.00 | 0.85 | 0.00 | 0.12 |
| Ground | 0.00 | 0.00 | 0.00 | 0.00 | 0.00 | 0.98 | 0.02 |
| Building | 0.00 | 0.00 | 0.00 | 0.00 | 0.04 | 0.00 | 0.96 |

Fig. 6a

|  | Tree | Car | Sign | Person | Bike | Ground | Building |
|---|---|---|---|---|---|---|---|
| Tree | 0.75 | 0.07 | 0.10 | 0.00 | 0.00 | 0.00 | 0.08 |
| Car | 0.11 | 0.73 | 0.00 | 0.00 | 0.05 | 0.00 | 0.11 |
| Sign | 0.09 | 0.00 | 0.78 | 0.13 | 0.00 | 0.00 | 0.00 |
| Person | 0.07 | 0.00 | 0.21 | 0.58 | 0.14 | 0.00 | 0.00 |
| Bike | 0.03 | 0.00 | 0.00 | 0.04 | 0.81 | 0.00 | 0.12 |
| Ground | 0.00 | 0.00 | 0.00 | 0.00 | 0.00 | 0.97 | 0.03 |
| Building | 0.05 | 0.00 | 0.00 | 0.00 | 0.04 | 0.00 | 0.95 |

Fig. 6b

OBJECTION RECOGNITION IN A 3D SCENE

FIELD OF THE INVENTION

The present invention relates to image processing, and more particularly to a process of object recognition in 3D street scene.

BACKGROUND OF THE INVENTION

Automatic urban scene object recognition refers to the process of segmentation and classifying of objects of interest in an image into predefined semantic labels, such as "building", "tree" or "road". This typically involves a fixed number of object categories, each of which requires a training model for classifying image segments. While many techniques for two-dimensional (2D) object recognition have been proposed, the accuracy of these systems is to some extent unsatisfactory, because 2D image cues are sensitive to varying imaging conditions such as lighting, shadow etc.

Three-dimensional (3D) object recognition systems using laser scanning, such as Light Detection And Ranging (LiDAR), provide an output of 3D point clouds. 3D point clouds can be used for a number of applications, such as rendering appealing visual effect based on the physical properties of 3D structures and cleaning of raw input 3D point clouds e.g. by removing moving objects (car, bike, person). Other 3D object recognition applications include robotics, intelligent vehicle systems, augmented reality, transportation maps and geological surveys where high resolution digital elevation maps help in detecting subtle topographic features.

However, identifying and recognizing objects despite appearance variation (change in e.g. texture, color or illumination) has turned out to be a surprisingly difficult task for computer vision systems. In the field of the 3D sensing technologies (such as LiDAR), a further challenge in organizing and managing the data is provided due to a huge amount of 3D point cloud data together with the limitations of computer hardware.

SUMMARY OF THE INVENTION

Now there has been invented an improved method and technical equipment implementing the method, by which the above problems are at least alleviated. Various aspects of the invention include a method, an apparatus and a computer program, which are characterized by what is stated in the independent claims. Various embodiments of the invention are disclosed in the dependent claims.

According to a first aspect, there is disclosed a method comprising: obtaining a three-dimensional (3D) point cloud about at least one object of interest; detecting ground and/or building objects from 3D point cloud data using an unsupervised segmentation method; removing the ground and/or building objects from the 3D point cloud data; and detecting one or more vertical objects from the remaining 3D point cloud data using a supervised segmentation method.

According to an embodiment, ground segmentation comprises dividing the 3D cloud point data into rectangular tiles in a horizontal plane; and determining an estimation of ground plane within the tiles.

According to an embodiment, determining the estimation of the ground plane within the tiles comprises dividing the tiles into a plurality of grid cells; searching a minimal-z-value point within each grid cell; searching points in each grid cell having a z-value within a first predetermined threshold from the minimal-z-value of the grid cell; collecting said points having the z-value within the first predetermined threshold from the minimal-z-value of the grid cell from each grid cell; estimating the ground plane of the tile on the basis of the collected points; and determining points locating within a second predetermined threshold from the estimated ground plane to comprise ground points of the tile.

According to an embodiment, building segmentation comprises projecting 3D points to range image pixels in a horizontal plane; defining values of the range image pixels as a function of number of 3D points projected to said range image pixel and a maximal z-value among the 3D points projected to said range image pixel; defining a geodesic elongation value for the objects detected in the range images; and distinguishing buildings from other objects on the basis of the geodesic elongation value.

According to an embodiment, the method further comprises binarizing the values of the range image pixels; applying morphological operations for merging neighboring points in the binarized range images; and extracting contours for finding boundaries of the objects.

According to an embodiment, the method further comprises applying voxel based segmentation to the remaining 3D point cloud data.

According to an embodiment, the voxel based segmentation comprises voxilisation of the 3D point cloud data, merging of voxels into super-voxels and carrying out supervised classification based on discriminative features extracted from super-voxels.

According to an embodiment, the method further comprises merging the 3D points into voxels comprising a plurality of 3D points such that for a selected 3D point, all neighboring 3D points within a third predefined threshold from the selected 3D point are merged into a voxel without exceeding a maximum number of 3D points in a voxel.

According to an embodiment, the method further comprises merging any number of voxels into super-voxels such that the following criteria is fulfilled:
  a minimal geometrical distance between two voxels is smaller than a fourth predefined threshold; and
  an angle between normal vectors of two voxels is smaller than a fifth predefined threshold.

According to an embodiment, the method further comprises extracting features from said super-voxels for classifying the super-voxels into objects.

According to an Embodiment, the Features Include One or More of the Following:
  geometrical shape;
  height of the voxel above ground;
  horizontal distance to center line of a street;
  surface normal of the voxel;
  voxel planarity;
  density of 3D points in the voxel;
  intensity of the voxel.

According to an embodiment, the method further comprises using a trained classifier algorithm for assigning said voxels with a semantic label.

According to an embodiment, the trained classifier algorithm is based on boosted decision trees, where a set of 3D features have been associated with manually labeled voxels in training images during offline training.

According to an embodiment, the 3D point cloud is derived using Light Detection And Ranging (LiDAR) method.

According to a second aspect, there is provided an apparatus comprising at least one processor, memory including computer program code, the memory and the computer program code configured to, with the at least one processor, cause the apparatus to at least:

obtain a three-dimensional (3D) point cloud about at least one object of interest;

detect ground and/or building objects from 3D point cloud data using an unsupervised segmentation method;

remove the ground and/or building objects from the 3D point cloud data; and detect one or more vertical objects from the remaining 3D point cloud data using a supervised segmentation method.

According to a third aspect, there is provided a computer readable storage medium stored with code thereon for use by an apparatus, which when executed by a processor, causes the apparatus to perform:

obtain a three-dimensional (3D) point cloud about at least one object of interest;

detect ground and/or building objects from 3D point cloud data using an unsupervised segmentation method;

remove the ground and/or building objects from the 3D point cloud data; and detect one or more vertical objects from the remaining 3D point cloud data using a supervised segmentation method.

These and other aspects of the invention and the embodiments related thereto will become apparent in view of the detailed disclosure of the embodiments further below.

LIST OF DRAWINGS

In the following, various embodiments of the invention will be described in more detail with reference to the appended drawings, in which FIG. 1 shows a computer graphics system suitable to be used in an object recognition process according to an embodiment;

FIGS. 3a, 3b illustrate an example of ground segmentation method according to an embodiment of the invention;

FIGS. 4a, 4b, 4c illustrate an example of building segmentation method according to an embodiment of the invention;

FIGS. 6a, 6b show tables of identification accuracy in two experiments carried out according to an embodiment of the invention.

DESCRIPTION OF EMBODIMENTS

Figure 1:
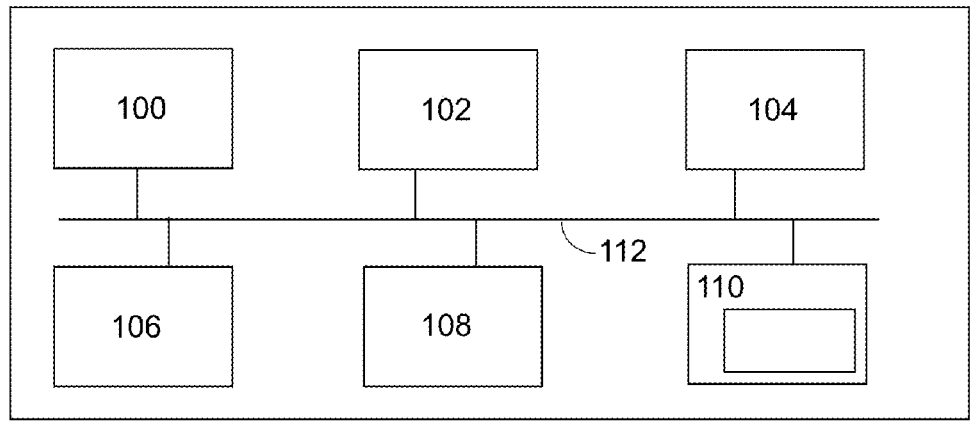

FIG. 1 shows a computer graphics system suitable to be used in image processing, for example in object recognition process according to an embodiment. The generalized structure of the computer graphics system will be explained in accordance with the functional blocks of the system. For a skilled man, it will be obvious that several functionalities can be carried out with a single physical device, e.g. all calculation procedures can be performed in a single processor, if desired. A data processing system of an apparatus according to an example of FIG. 1 includes a main processing unit 100, a memory 102, a storage device 104, an input device 106, an output device 108, and a graphics subsystem 110, which all are connected to each other via a data bus 112.

The main processing unit 100 is a conventional processing unit arranged to process data within the data processing system. The memory 102, the storage device 104, the input device 106, and the output device 108 are conventional components as recognized by those skilled in the art. The memory 102 and storage device 104 store data within the data processing system 100. Computer program code resides in the memory 102 for implementing, for example, an object recognition process. The input device 106 inputs data into the system while the output device 108 receives data from the data processing system and forwards the data, for example to a display. The data bus 112 is a conventional data bus and while shown as a single line it may be a combination of a processor bus, a PCI bus, a graphical bus, and an ISA bus. Accordingly, a skilled man readily recognizes that the apparatus may be any conventional data processing device, such as a computer device, a personal computer, a server computer, a mobile phone, a smart phone or an Internet access device, for example Internet tablet computer. The input data of the object recognition process according to an embodiment and means for obtaining the input data are described further below.

It needs to be understood that different embodiments allow different parts to be carried out in different elements. For example, various processes of the object recognition may be carried out in one or more processing devices; for example, entirely in one computer device, or in one server device or across multiple user devices The elements of the object recognition process may be implemented as a software component residing on one device or distributed across several devices, as mentioned above, for example so that the devices form a so-called cloud.

Object recognition is a traditional computer vision problem. Automatic urban scene object recognition refers to the process of segmentation and classifying of objects of interest in an image into predefined semantic labels, such as "building", "tree" or "road". This typically involves a fixed number of object categories, each of which requires a training model for classifying image segments.

The 3D point cloud may be derived using Light Detection And Ranging (LiDAR) method. In the LiDAR method, distances are measured by illuminating a target with a laser beam (e.g. ultraviolet, visible, or near-infrared light) and analyzing the reflected light. The resulting data is stored as point clouds. The LiDAR point clouds may be considered a set of vertices in a three-dimensional coordinate system, wherein a vertex may be represented by a planar patch defined by a 3D vector.

Laser scanning can be divided into three categories, namely, Airborne Laser Scanning (ALS), Terrestrial Laser Scanning (TLS) and Mobile Laser Scanning (MLS).

Mobile Terrestrial LiDAR (MTL) provides accurate, high-resolution 3D information (e.g. longitude, latitude, altitude) as well as reflectance properties of urban environment. For obtaining MTL 3D information about an environment, for example a vehicle-based mobile mapping system may be used. Such a mobile mapping system may comprise at least a panoramic camera capable of capturing 360° panoramic view around the moving vehicle and a plurality (e.g. 4-8) of hi-resolution cameras, each arranged to capture a segment of the 360° panoramic view around the moving vehicle.

The mobile mapping system may comprise a LiDAR unit for scanning the surroundings with a laser beam, analysing the reflected light and storing the results as point clouds. The LiDAR unit may comprise, for example, a LiDAR sensor consisting of 64 lasers mounted on upper and lower blocks with 32 lasers in each side and the entire unit spins. The LiDAR unit may generate and store, for example, 1.5 million points per second. The mobile mapping system may further comprise a satellite positioning unit, such as a GPS receiver, for determining the accurate location the moving vehicle and Inertial Measurement Unit (IMU) and Distance Measurement Instrument (DMI). The vehicle may be driven at the posted speed limit and the sensors are calibrated and synchronized to produce a coupled collection of high quality geo-referenced (i.e. latitude, longitude and altitude) data. The perspective camera image is generated by rendering the spherical panorama, for example with a view port of 2032× 2032 pixels.

The LiDAR data is a typical big data. For instance, the LiDAR point cloud of a building normally contains more than millions of points. Consequently, while a laser scanning or LiDAR system provides a readily available solution for capturing spatial data in a fast, efficient and highly accurate way, the captured data has enormous volume and it typically comes with no semantic meanings.

In the field of machine learning, the used methods can be divided in supervised learning methods and unsupervised learning methods. Supervised learning is a machine learning task, in which a function from labeled training data is inferred. Unsupervised learning refers to a learning task, wherein a hidden structure is searched in unlabeled data.

Herein below, a novel object recognition process is presented, which significantly reduces the amount of data to be processed, and especially the need for manual labelling of training data. The method according to the embodiment is illustrated in FIG. 2.

Figure 2:
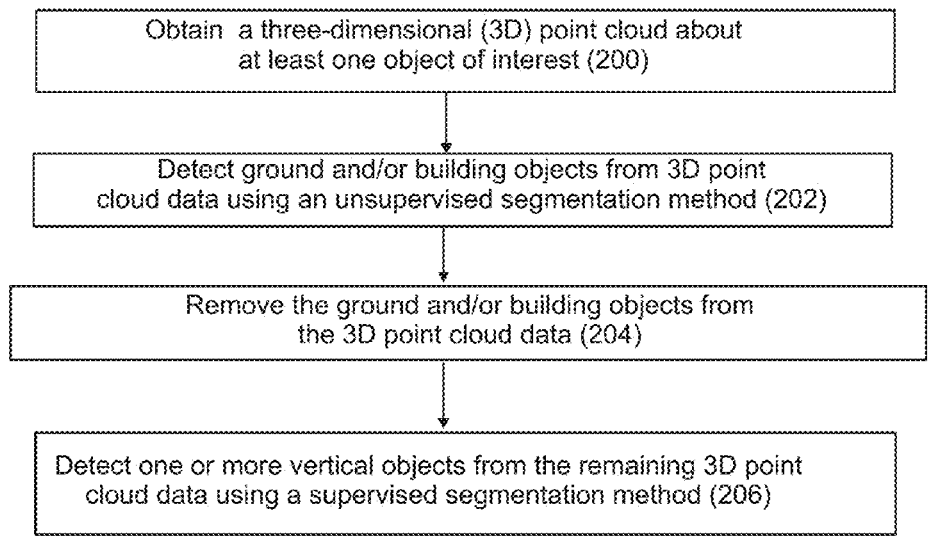
FIG. 2 shows a flow chart of an object recognition process according to an embodiment of the invention.

In the method of FIG. 2, a three-dimensional (3D) point cloud about at least one object of interest is obtained (200) as an input for the process. Ground and/or building objects are detected (202) from 3D point cloud data using an unsupervised segmentation method, and the detected ground and/or building objects are removed from the 3D point cloud data. Then, from the remaining 3D point cloud data, one or more vertical objects are detected (206) using a supervised segmentation method.

In other words, a hybrid two-stage approach is taken to address the problems caused by the noise in the data, huge data volume and movement of objects in the 3D point cloud. Firstly, an unsupervised segmentation method is used to detect and remove dominant ground and buildings from the 3D point cloud data, where these two dominant classes often correspond to the majority of point clouds. Secondly, after removing these two classes, a pre-trained boosted decision tree classifier can be used to label local feature descriptors extracted from remaining vertical objects in the scene. The combination of unsupervised segmentation and supervised classifiers provides a good trade-off between efficiency and accuracy.

According to an embodiment, the ground segmentation comprises dividing the 3D cloud point data into rectangular tiles in a horizontal plane, and determining an estimation of ground plane within the tiles.

The aim of the ground segmentation is to remove points belonging to the scene ground, such as roads and sidewalks. Therefore, the original point cloud is divided into ground and vertical object point clouds, as shown in FIG. 3a, where the ground points are shown as rasterized and the vertical points are shown as dark. The 3D point cloud of the scene is first divided into a set of rectangular, non-overlapping tiles along the horizontal x-y plane. The size of the tiles may be e.g. 10 m×10 m.

It is assumed that ground points are vertically low, i.e. have relatively small z values as compared to points belonging to other objects, such as buildings or trees. The ground is not necessarily horizontal, yet it is assumed that there is a constant slope of the ground within each tile.

According to an embodiment, determining the estimation of the ground plane within the tiles comprises dividing the tiles into a plurality of grid cells; searching a minimal-z-value point within each grid cell; searching points in each grid cell having a z-value within a first predetermined threshold from the minimal-z-value of the grid cell; collecting said points having the z-value within the first predetermined threshold from the minimal-z-value of the grid cell from each grid cell; estimating the ground plane of the tile on the basis of the collected points; and determining points locating within a second predetermined threshold from the estimated ground plane to comprise ground points of the tile.

With a reference to FIG. 3b, the following ground plane fitting method is repeated for each tile:

The tile is examined in grid cells of a predetermined size, e.g. 25 cm×25 cm. The minimal-z-value (MZV) points within a multitude of 25 cm×25 cm grid cells are searched at different locations. For each grid cell, neighboring points that are within a z-distance threshold from the MZV point are retained as candidate ground points. Subsequently, an estimation method, for example a RANSAC (RANdom SAmple Consensus) method, is adopted to fit a plane p to candidate ground points that are collected from all cells. Finally, 3D points that are within a predetermined distance (such as d2 in FIG. 3b) from the fitted plane p are considered as ground points of each tile.

Experimental results have shown that the constant slope assumption made in this approach is valid for typical 3D point cloud data sets. The ground plane fitting method may be implemented as fully automatic and the change of two thresholds parameters z and d2 does not lead to dramatic change in the results. On the other hand, the setting of grid cell size as 25 cm×25 cm maintains a good balance between accuracy and computational complexity.

After segmenting out the ground points from the scene, building surfaces may be detected. The high volume of 3D point cloud data imposes a significant challenge to the extraction of building facades. For simplifying the detection of building surfaces (e.g. doors, walls, facades, noisy scanned inner environment of building) from the 3D point cloud data, the following assumptions are made: a) building facades are the highest vertical structures in the street; and b) other non-building objects are located on the ground between two sides of street.

According to an embodiment, the building segmentation comprises projecting 3D points to range image pixels in a horizontal plane; defining values of the range image pixels as a function of number of 3D points projected to said range image pixel and a maximal z-value among the 3D points projected to said range image pixel; defining a geodesic elongation value for the objects detected in the range images; and distinguishing buildings from other objects on the basis of the geodesic elongation value.

FIGS. 4a-4c illustrate possible steps of a building segmentation method according to an embodiment. The building segmentation method utilizes range images because they are convenient structures to process data. As shown in FIG. 4a, range images may be generated by projecting the 3D point clouds to horizontal x-y plane. In this way, several points are projected on the same range image pixel. The number of points falling into each pixel is counted and the number is assigned as a pixel intensity value. In addition, the maximal height among all projected points on the same pixel is selected and stored as height value.

The values of the range image pixels may be defined as a weighted function of number of 3D points projected to said range image pixel and a maximal z-value among the 3D points projected to said range image pixel.

According to an embodiment, the method further comprises binarizing the values of the range image pixels; applying morphological operations for merging neighboring points in the binarized range images; and extracting contours for finding boundaries of the objects.

Range images are defined by making threshold and binarization of I, where I pixel value is defined as Equation (1)

$$I_i = (P_{intensity}/\text{Max\_}P_{intensity}) + (P_{height}/\text{Max\_}P_{height}) \quad (1.)$$

where $I_i$ is grayscale range image pixel value, $P_{intensity}$ and $P_{height}$ are intensity and height pixel values and $\text{Max\_}Pi_{intensity}$ and $\text{Max\_}P_{height}$ represent the maximum intensity and height values over the grayscale image.

Morphological operation (e.g. erosion, dilation, opening, closing) may be used to merge neighboring points and to fill holes in the binary range images, as illustrated in FIG. 4b. Next, contours are extracted to find boundaries of objects. For example, Pavlidis contour-tracing algorithm ("Algorithms for graphics and image processing", Computer science press, 1982) may be used to identify each contour as a sequence of edge points. The resulting segments are checked on one or more aspects, such as size and diameters (i.e. height and width), to distinguish buildings from other objects.

Herein, the concept of geodesic elongation of an object, introduced by Lantuejoul and Maisonneuve (1984), may be used to distinguish buildings from other objects. Geodesic elongation gives an estimate of tendency of the object to be elongated without having very much information about the shape of the object. More specifically, equation (2) defines the geodesic elongation E(X) of an object X, where S(X) is the area of the object X and L(X) is the geodesic diameter.

$$E(X) = (\pi L^2(X))/4S(X) \quad (2.)$$

The compactness of the polygon shape based on equation (2) can be applied to distinguish buildings from other objects such as trees. Considering the sizes and shape of buildings, the extracted boundary will be eliminated if its size is less than a threshold. The above method takes advantage of priori knowledge about urban scene environment and assumes that there are not any important objects laid on the building facades. Despite of this seemingly oversimplified assumption, the experimental results show that the method performs quite well with urban scenes.

The resolution of range image may be adjusted in order to find a suitable balance between detailed results and laborious computation. If each pixel in the range image covers large area in 3D space, too many points would be projected as one pixel and fine details would not be preserved. On the other hand, selecting large pixel size compared to real world resolution leads to connectivity problems, which would no longer justify the use of range images. In the experiments, a pixel corresponding to a square of size 0.05 m$^2$ has shown to provide a reasonable balance between detailed results and computational complexity.

The segmentation of ground and buildings, as described above, using unsupervised segmentation methods is computationally a rather straightforward task. After segmenting out the ground and building points from the scene, an inner street view based algorithm can be used to cluster point clouds. Although top view range image analysis, as used in building segmentation, generates a very fast segmentation result, there are a number of limitations to utilize it for the small vertical objects, such as pedestrians and cars. These limitations are overcome by using inner view (lateral) or ground based system in which, unlike in the top view, the 3D data processing is done more precisely and the point view processing is closer to objects which provides a more detailed sampling of the objects.

However, such a method demands more processing power to handle the increased volume of 3D data. The 3D point clouds, as such, contain a limited amount of positional information and they do not illustrate color and texture properties of an object.

According to an embodiment, these problems may be alleviated by applying voxel based segmentation to the remaining 3D point cloud data. In voxel based segmentation, points which are merely a consequence of a discrete sampling of 3D objects are merged into clusters of voxels to represent enough discriminative features to label objects. 3D features, such as intensity, area and normal angle, are extracted based on these clusters of voxels.

Figure 5A:
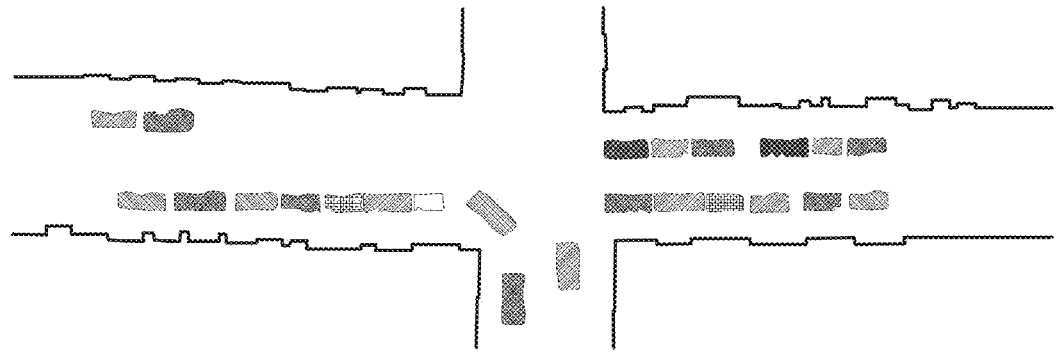
FIGS. 5a, 5b, 5c illustrate an example of voxelisation of a 3D point cloud according to an embodiment of the invention.
Figure 5B:
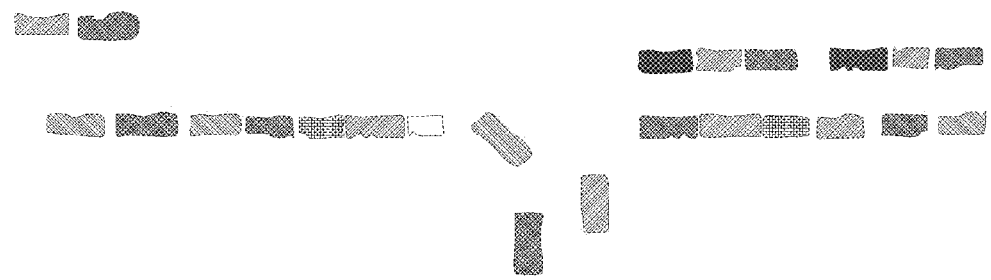
Figure 5C:
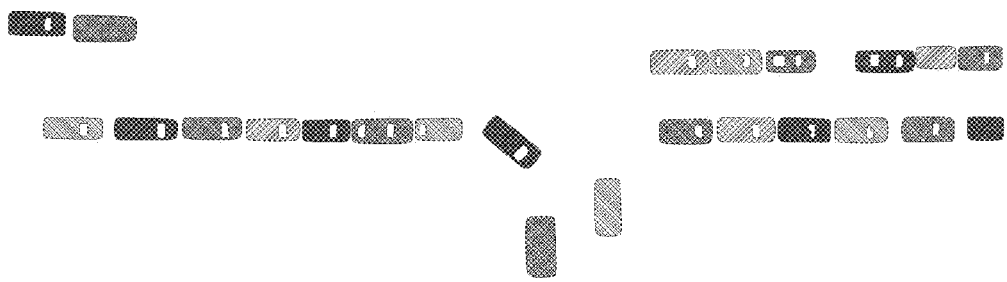

According to an embodiment, the voxel based segmentation may be divided into three steps, voxilisation of a point cloud, merging of voxels into super-voxels and the supervised classification based on discriminative features extracted from super-voxels. The results of some these steps are illustrated in FIGS. 5a-5c, wherein FIG. 5a illustrates an example of a top view point cloud used as an input for the voxel based segmentation, wherein FIG. 5a shows a plurality of cars parked along a street.

Voxelisation of Point Cloud

According to an embodiment, the method further comprises merging the 3D points into voxels comprising a plurality of 3D points such that for a selected 3D point, all neighboring 3D points within a third predefined threshold from the selected 3D point are merged into a voxel without exceeding a maximum number of 3D points in a voxel.

In the voxelisation step, an unorganized point cloud p is partitioned into small parts, called voxel v. FIG. 5b illustrates an example of voxelisation results, in which small vertical objects point cloud such as cars are broken into smaller partition. In the example of FIG. 5b, almost every car is composed of a plurality of voxels shown in black, white and different shades of grey. The aim of using voxelisation is to reduce computation complexity and to form a higher level representation of point cloud scene. For example, a number of points is grouped together to form a variable size voxels. The criteria of including a new point $p_{in}$ into an existing voxel $v_i$ can be determined by the minimal distance threshold $d_{th}$, which is defined as Equation (3):

$$\min(\|p_{im} - p_{in}\|_2) \leq d_{th}; 0 \leq m; n \leq N; m \neq n \quad (3.)$$

where $p_{im}$ is an existing 3D point in voxel, $p_{in}$ is a candidate point to merge to the voxel, i is the cluster index, $d_{th}$ is the maximum distance between two point, and N is the maximum point number of a cluster. If the condition is met, the candidate point $p_{in}$ is added to the voxel $v_i$ and the process is repeated until no more point that satisfies the condition is found.

The above process may be illustrated as the following algorithm:

repeat
   select a 3D point for voxelisation;
   find all neighboring points to be included in the voxel fulfilling the condition that:
   merge a point $p_{in}$ to the voxel if its distance to any point $p_{im}$ in the voxel will not be greater than a given distance ($d_{th}$);
until all 3D points are used in a voxel or the size of cluster is less than (N).

Equation (3) ensures that the distance between any point and its neighbors belonging to the same cluster is less than $d_{th}$. Although the maximum voxel size is predefined, the actual voxel size depends on the maximum number of points in the voxel (N) and minimum distance between the neighboring points.

Super Voxelisation

According to an embodiment, for transformation of voxels to a super voxel, voxels may be merged via region growing with respect to the following properties of a cluster being fulfilled:

If the minimal geometrical distance, $D_{ij}$, between two voxels $v_i$ and $v_j$ is smaller than a given threshold, where $D_{ij}$ is defined as:

$$D_{ij} = \min(\|p_{ik} - p_{jl}\|_2); k \in (1,m); l \in (1,n) \quad (4.)$$

where voxels vi and $v_j$ have m and n points respectively, and $p_{ik}$ and $p_{jl}$ are the 3D point belong to the voxels $v_i$ and $v_j$ If the angle between normal vectors of two voxels $v_i$ and $v_j$ is smaller than a threshold, where the angle between two s-voxels is defined as an angle between their normal vectors (equation 5):

$$\theta_{ij} = \arccos(<n_i, n_j>) \quad (5.)$$

where $n_i$ and $n_j$ are normal vectors at $v_i$ and $v_j$, respectively.

In the above equation 5, the normal vector may be calculated e.g. using PCA (Principal Component Analysis) disclosed by Klasing, K. et al.: "Comparison of surface normal estimation methods for range sensing applications" in: IEEE International Conference on Robotics and Automation, 2009, ICRA'09, IEEE (2009) 3206-3211.

The above grouping algorithm merges the voxels by considering the geometrical distance ($M < d_{th}$) and the normal features of the clusters ($\theta_{ij} < \theta_{th1}$). The above voxelisation steps may then be used in grouping the super-voxels (from now onwards referred to as s-voxels) into labeled objects. The advantage of this approach is that the reduced number of super voxels can be used to obtain similar results for classification, instead of using thousands of points in the data set. FIG. 5c illustrates an example of s-voxelisation results, where the each car represents a s-voxel of its own, which is illustrated by solid color of each car.

Feature Extraction

For each s-voxel, a plurality of main features may be extracted to train the classifier. The plurality of main features may include one or more of the following: geometrical shape, height above ground, horizontal distance to center line of street, density, intensity, normal angle and planarity. In order to classify the s-voxels, it is assumed that the ground points have been segmented well. Even though the object types are distinctly different to each other, the main features as mentioned above are sufficient to classify them.

Geometrical shape: Along with the above mentioned features, geometrical shape descriptors play an important role in classifying objects. These shape-related features may be computed based on the projected bounding box to x-y plane (ground). Projected bounding box has effective features due to the invariant dimension of objects. Four features may be extracted based on the projected bounding box to represent the geometry shape of objects:

Area: the area of the bounding box is used for distinguishing large-scale objects and small objects.

Edge ratio: the ratio of the long edge and short edge.

Maximum edge: the maximum edge of bounding box.

Covariance: used to find relationships between point spreading along two largest edges.

Height above ground: Given a collection of 3D points with known geographic coordinates, the median height of all points may be considered to be the height feature of the s-voxel. The height information is independent of the camera pose and may be calculated by measuring the distance between points and the road ground.

Horizontal distance to center line of street: The horizontal distance of each s-voxel to the center line of street may be computed as a second geographical feature. The street line is estimated by fitting a quadratic curve to the segmented ground.

Density: Some objects with porous structure, such as a fence or a car with windows, have lower density of point cloud as compared to others, such as trees and vegetation. Therefore, the number of 3D points in a s-voxel may be used as a strong cue to distinguish different classes.

Intensity: LiDAR systems provide not only positioning information but also reflectance property, referred to as intensity, of laser scanned objects. The intensity feature may be used herein, in combination with other features, to classify 3D points. More specifically, the median intensity of points in each s-voxel may be used to train the classifier.

Normal angle: Surface normal may be extracted for each s-voxel. Then an accurate method to compute the surface normal may be applied by fitting a plane to the 3D points in each s-voxel. For example, the RANSAC algorithm may be used to remove outliers which may correspond to very "close" objects such as a pedestrian or a vehicle.

Planarity: Patch planarity may be defined as the average square distance of all 3D points from the best fitted plane computed by the RANSAC algorithm. This feature may be useful for distinguishing planar objects with smooth surface, such as cars, from non-planar objects, such as trees.

Classifier

The boosted decision trees have demonstrated superior classification accuracy and robustness in many multi-class classification tasks. An example of boosted decision tress is disclosed e.g. in "Logistic regression, adaboost and bregman distances," by M. Collins, R. Schapire, and Y. Singer; Machine Learning, vol. 48, no. 1-3, 2002. Acting as weaker learners, decision trees automatically select features that are relevant to the given classification problem. Given different weights of training samples, multiple trees are trained to minimize average classification errors. Subsequently, boosting is done by logistic regression version of Adaboost to achieve higher accuracy with multiple trees combined together.

A skilled man appreciates that any of the embodiments described above may be implemented as a combination with one or more of the other embodiments, unless there is explicitly or implicitly stated that certain embodiments are only alternatives to each other.

The object recognition method and its embodiments as described above were tested in comprehensive experiments using 3D point cloud databases obtained from three cities using two different laser scanning technologies: Terrestrial Laser Scanning (TLS), which is useful for large scale buildings survey, roads and vegetation, more detailed but slow in urban surveys in outdoor environments; and Mobile Laser Scanning (MLS), which is less precise than TLS but much more productive since the sensors are mounted on a vehicle. In the experiments, well-known 3D Velodyne LiDAR database was used as a TLS dataset, and Paris-rue-Madame and NAVTAQ True databases were used as MLS datasets.

In the experiments, 20 decision trees were used, each of which had 6 leaf nodes, thus enabling to label, in addition to ground and building, 6 semantic object classes: tree, car, sign-symbol, person, bike and fence. The boosted decision tree classifiers were trained with sample 3D features extracted from training s-voxels. Subsequently the performance of the trained classifier was tested using separated test samples. The accuracy of each test is evaluated by comparing the ground truth with the scene parsing results. Global accuracy is reported as the percentage of correctly classified s-voxels, per-class accuracy as the normalized diagonal of the confusion matrix and class average represents the average value of per-class accuracies.

The Velodyne LiDAR database includes ten high accurate 3D point cloud scenes collected by a Velodyne LiDAR mounted on a vehicle navigating through the Boston area. Each scene is a single rotation of the LIDAR, yielding a point cloud of nearly 70,000 points. Scenes may contain objects including cars, bicycles, buildings, pedestrians and street signs.

The table in FIG. 6a shows a confusion matrix resulting from the experiments, illustrating the identification accuracy in five semantic object classes in addition to ground and building. The results show that the recognition accuracy for ground and building points is approximately 98% and 96%, respectively. The classifier was trained using seven scene datasets, selected randomly, and it was tested on the remaining three scenes. The confusion matrix shows that the algorithm performs well on most per-class accuracies with the heights accuracy 98% for ground and the lowest 72% for sign-symbol. The global accuracy and per-class accuracy are also very high, about 94% and 87%, respectively.

Paris-rue-Madame and NAVTAQ True datasets contains 3D MLS data. The Paris-rue-Madame point cloud is collected from a 160 m long part of rue Madame Street. The dataset contains 20 million points, 642 objects categorized in 26 classes. The second MLS dataset is collected by NAVTAQ True system consisting of point cloud from New York streets. This LiDAR data was collected using terrestrial scanners and contains approximately 710 million points covering 1.2 km. Similarly to TLS evaluating test, a plurality of object categories were used and the Paris-rue-Madame and NAVTAQ True datasets were divided into two portions: the training set and the testing set.

The table in FIG. 6b shows a confusion matrix resulting from the experiments. Comparing to Terrestrial Laser Scanning, the results are not as good as shown in Table 6a. The main reason for this is caused by the fact that mixing two datasets captured from different cities poses serious challenges to the parsing pipeline. Furthermore, 3D street object detection is a much more difficult task than reconstructing walls or road surface. Because street objects can have virtually any shape and due to small resolution and the fact that the LiDAR only scans one side of the object, the detection may sometimes be impossible. Moving objects are even harder to reconstruct based solely on LiDAR data. As these objects (typically vehicles, people) are moving through the scene, it makes them to appear like a long-drawn shadow in the registered point cloud. The long shadow artifact does not appear in TLS system because there only one point is used as an exposure point to scan the street objects. Nevertheless, the results in ground and building detection are practically as good as with TLS.

As confirmed by the experiments, the various embodiments may provide advantages over state of the art. The two-stage object recognition method presented above requires only small amount of time for training while the classification accuracy is robust to different types of LiDAR point clouds acquisition methods. In addition, the two-stage object recognition method significantly reduces the need for manual labelling of the training data. Consequently, classifiers trained in one type of LiDAR point clouds acquisition method can now be applied to a 3D point cloud obtained using another LiDAR point clouds acquisition method with high accuracy. Moreover, by detecting ground and building objects from the 3D point cloud data using an unsupervised segmentation method, huge amount of data (more than 75% of points) are labeled, and only small amount of point cloud which have complex shape remains to be segmented. Thus, the computational efficiency is significantly improved.

The various embodiments of the invention can be implemented with the help of computer program code that resides in a memory and causes the relevant apparatuses to carry out the invention. For example, an apparatus may comprise circuitry and electronics for handling, receiving and transmitting data, computer program code in a memory, and a processor that, when running the computer program code, causes the terminal device to carry out the features of an embodiment.

It is obvious that the present invention is not limited solely to the above-presented embodiments, but it can be modified within the scope of the appended claims.

The invention claimed is:

1. A method, comprising:
   obtaining a three-dimensional (3D) point cloud about at least one object of interest;
   detecting at least one of ground and building objects from 3D point cloud data using an unsupervised segmentation method;
   removing the at least one of ground and building objects from the 3D point cloud data;
   detecting one or more vertical objects from remaining 3D point cloud data using a supervised segmentation method;
   dividing the 3D cloud point data into rectangular tiles in a horizontal plane; and
   determining an estimation of a ground plane within the rectangular tiles, wherein determining the estimation of the ground plane within the rectangular tiles comprises:
   dividing the rectangular tiles into a plurality of grid cells;
   searching a minimal-z-value point within each grid cell;
   searching points in the each grid cell having a z-value within a first predetermined threshold from the minimal-z-value of a grid cell;
   collecting the points having the z-value within the first predetermined threshold from the minimal-z-value of the grid cell from each grid cell;
   estimating the ground plane of a tile on the basis of the collected points; and
   determining points locating within a second predetermined threshold from the estimated ground plane to comprise ground points of the tile.

2. The method according to claim 1, further comprising:
   projecting 3D points to range image pixels in a horizontal plane;
   defining values of the range image pixels as a function of number of 3D points projected to the range image pixels and a maximal z-value among the 3D points projected to the range image pixels;
   defining a geodesic elongation value for objects detected in the range image pixels; and distinguishing buildings from other objects on the basis of the geodesic elongation value.

3. The method according to claim 2, the method further comprising:
binarizing the values of the range image pixels;
applying morphological operations for merging neighboring points in the binarized values of the range image pixels; and
extracting contours for finding boundaries of the objects.

4. The method according to claim 1 further comprising applying a voxel based segmentation to the remaining 3D point cloud data, wherein the voxel based segmentation comprises:
performing voxilisation of the 3D point cloud data; and
merging of voxels into super-voxels and carrying out supervised classification based on discriminative features extracted from the super-voxels.

5. The method according to claim 4 further comprising:
merging the 3D points into voxels comprising a plurality of 3D points such that for a selected 3D point, all neighboring 3D points within a third predefined threshold from the selected 3D point are merged into a voxel without exceeding a maximum number of 3D points in the voxel.

6. The method according to claim 4, further comprising:
merging any number of the voxels into the super-voxels such that a criteria is fulfilled, the criteria comprising:
a minimal geometrical distance between two voxels is smaller than a fourth predefined threshold; and
an angle between normal vectors of the two voxels is smaller than a fifth predefined threshold.

7. The method according to claim 4 further comprising:
extracting features from the super-voxels for classifying the super-voxels into objects.

8. The method according to claim 7, wherein the features include one or more of:
geometrical shape;
height of a voxel above ground;
horizontal distance of the voxel to a center line of a street;
surface normal of the voxel;
voxel planarity;
density of 3D points in the voxel; and
intensity of the voxel.

9. An apparatus, comprising at least one processor, memory including computer program code, the memory and the computer program code configured to, with the at least one processor, cause the apparatus to at least:
obtain a three-dimensional (3D) point cloud about at least one object of interest;
detect at least one of ground and building objects from 3D point cloud data using an unsupervised segmentation method;
remove the at least one of ground and building objects from the 3D point cloud data; and
detect one or more vertical objects from remaining 3D point cloud data using a supervised segmentation method;
divide the 3D cloud point data into rectangular tiles in a horizontal plane; and
determine an estimation of a ground plane within the rectangular tiles, wherein to determine the estimation of the ground plane within the rectangular tiles, the apparatus is further caused to:
divide the rectangular tiles into a plurality of grid cells;
search a minimal-z-value point within each grid cell;
search points in the each grid cell having a z-value within a first predetermined threshold from the minimal-z-value of a grid cell;
collect the points having the z-value within the first predetermined threshold from the minimal-z-value of the grid cell from the each grid cell;
estimate the ground plane of a tile on the basis of the collected points; and
determine points locating within a second predetermined threshold from the estimated ground plane to comprise ground points of the tile.

10. The apparatus according claim 9, wherein the apparatus is further caused to:
project 3D points to range image pixels in a horizontal plane;
define values of the range image pixels as a function of number of 3D points projected to the range image pixels and a maximal z-value among the 3D points projected to the range image pixels;
define a geodesic elongation value for objects detected in the range image pixels; and
distinguish buildings from other objects on the basis of the geodesic elongation value.

11. The apparatus according to claim 10, wherein the apparatus is further caused to:
binarize the values of the range image pixels;
apply morphological operations for merging neighboring points in the binarized values of the range image pixels; and
extract contours for finding boundaries of the objects.

12. The apparatus according to claim 9, wherein the apparatus is further caused to apply a voxel based segmentation to the remaining 3D point cloud data, and wherein to apply the voxel based segmentation, the apparatus is further caused to:
perform voxilisation of the 3D point cloud data;
merge voxels into super-voxels; and
carry out supervised classification based on discriminative features extracted from the super-voxels.

13. The apparatus according to claim 12, wherein the apparatus is further caused to merge the 3D points into voxels comprising a plurality of 3D points such that for a selected 3D point, all neighboring 3D points within a third predefined threshold from the selected 3D point are merged into a voxel without exceeding a maximum number of 3D points in the voxel.

14. The apparatus according to claim 12, wherein the apparatus is further caused to merging any number of the voxels into the super-voxels such that following criteria is fulfilled:
a minimal geometrical distance between two voxels is smaller than a fourth predefined threshold; and
an angle between normal vectors of the two voxels is smaller than a fifth predefined threshold.

15. The apparatus according to claim 12, wherein the apparatus is the apparatus is further caused to extract features from the super-voxels for classifying the super-voxels into objects.

16. The apparatus according to claim 15, wherein the features include one or more of:
geometrical shape;
height of a voxel above ground;
horizontal distance of the voxel to a center line of a street;
surface normal of the voxel;
voxel planarity;
density of 3D points in the voxel; and
intensity of the voxel.

17. A non-transitory computer readable storage medium stored with code thereon for use by an apparatus, which when executed by a processor, causes the apparatus to perform:
- obtain a three-dimensional (3D) point cloud about at least one object of interest;
- detect at least one of ground and building objects from 3D point cloud data using an unsupervised segmentation method;
- remove the at least one of ground and building objects from the 3D point cloud data; and
- detect one or more vertical objects from remaining 3D point cloud data using a supervised segmentation method;
- divide the 3D cloud point data into rectangular tiles in a horizontal plane; and
- determine an estimation of a ground plane within the rectangular tiles, wherein to determine the estimation of the ground plane within the rectangular tiles, the apparatus is further caused to perform:
- divide the rectangular tiles into a plurality of grid cells;
- search a minimal-z-value point within each grid cell;
- search points in the each grid cell having a z-value within a first predetermined threshold from the minimal-z-value of a grid cell;
- collect the points having the z-value within the first predetermined threshold from the minimal-z-value of the grid cell from the each grid cell;
- estimate the ground plane of a tile on the basis of the collected points; and
- determine points locating within a second predetermined threshold from the estimated ground plane to comprise ground points of the tile.

* * * * *